United States Patent
Kim et al.

(10) Patent No.: US 10,779,144 B2
(45) Date of Patent: Sep. 15, 2020

(54) METHOD AND APPARATUS FOR TRANSMITTING DOWNLINK DATA AND UPLINK DATA IN NB-IOT SYSTEM

(71) Applicant: ELECTRONICS AND TELECOMMUNICATIONS RESEARCH INSTITUTE, Daejeon (KR)

(72) Inventors: Hyung-Sub Kim, Daejeon (KR); Jeehyeon Na, Daejeon (KR); Do Hyun Park, Daegu (KR); Chan Yong Lee, Sejong-si (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 15/846,737

(22) Filed: Dec. 19, 2017

(65) Prior Publication Data

US 2018/0192271 A1    Jul. 5, 2018

(30) Foreign Application Priority Data

Dec. 30, 2016 (KR) .................. 10-2016-0184066
Nov. 23, 2017 (KR) .................. 10-2017-0157648

(51) Int. Cl.
*H04W 4/70* (2018.01)
*H04W 72/04* (2009.01)
(Continued)

(52) U.S. Cl.
CPC .......... *H04W 4/70* (2018.02); *H04L 63/00* (2013.01); *H04W 12/02* (2013.01); *H04W 12/10* (2013.01);
(Continued)

(58) Field of Classification Search
CPC ....... H04W 4/70; H04W 76/27; H04W 12/02; H04W 12/10; H04W 72/0413;
(Continued)

(56) References Cited

U.S. PATENT DOCUMENTS 9,872,209 B1* 1/2018 Saleh ............... H04W 36/0066
2012/0155404 A1 6/2012 Shin et al.
(Continued)

FOREIGN PATENT DOCUMENTS

| KR | 10-2012-0070444 A | 6/2012 |
| KR | 10-2016-0084680 A | 7/2016 |
| KR | 10-2017-0017757 A | 2/2017 |

OTHER PUBLICATIONS

3GPP TS 36331 V13.2.0 (Jun. 2016).
(Continued)

*Primary Examiner* — Chi Tang P Cheng
(74) *Attorney, Agent, or Firm* — LRK Patent Law Firm (57) ABSTRACT

A method for transmitting downlink by a network node. The network node creates downlink data for a terminal which is in a radio resource control (RRC) idle state. The network node inserts the downlink data into a first paging message for transitioning the terminal to an RRC connected state, when a size of the downlink data is smaller than a reference value. In addition, the network node transmits the first paging message to the terminal through a base station.

3 Claims, 8 Drawing Sheets

(51) Int. Cl.

| | |
|---|---|
| *H04W 76/27* | (2018.01) |
| *H04L 29/06* | (2006.01) |
| *H04W 12/02* | (2009.01) |
| *H04W 12/10* | (2009.01) |
| *H04W 88/06* | (2009.01) |
| *H04L 29/08* | (2006.01) |
| *H04W 68/00* | (2009.01) |

(52) U.S. Cl.
CPC ..... *H04W 72/042* (2013.01); *H04W 72/0413* (2013.01); *H04W 76/27* (2018.02); *H04L 67/12* (2013.01); *H04W 68/00* (2013.01); *H04W 88/06* (2013.01)

(58) Field of Classification Search
CPC ... H04W 72/042; H04W 68/00; H04W 88/06; H04L 63/00; H04L 67/12
USPC .......................................................... 370/310
See application file for complete search history.

(56) References Cited

U.S. PATENT DOCUMENTS

| | | | |
|---|---|---|---|
| 2014/0064124 A1* | 3/2014 | Paladugu | H04W 76/19 370/252 |
| 2015/0373608 A1* | 12/2015 | Zhu | H04W 76/25 370/252 |
| 2017/0019930 A1* | 1/2017 | Lee | H04W 74/0833 |
| 2017/0041873 A1 | 2/2017 | Wu | |
| 2017/0332348 A1* | 11/2017 | Takahashi | H04W 28/14 |
| 2018/0192439 A1* | 7/2018 | Tang | H04W 74/08 |
| 2018/0295556 A1* | 10/2018 | Baek | H04W 8/02 |
| 2018/0317218 A1* | 11/2018 | Li | H04W 76/10 |

OTHER PUBLICATIONS

3GPP TS 36.413 V133.0 (Jun. 2016).
Maria Rita Palattella et al., "Internet of Things in the 5G Era: Enablers, Architecture, and Business Models", IEEE Journal on Selected Areas in Communications, vol. 34, No. 3, Mar. 2016.
Sung-Min Oh et al., "An Efficient Small Data Transmission Scheme in the 3GPP NB-IoT System", IEEE Communications Letters, 2016.

* cited by examiner

METHOD AND APPARATUS FOR TRANSMITTING DOWNLINK DATA AND UPLINK DATA IN NB-IOT SYSTEM

CROSS-REFERENCE TO RELATED APPLICATIONS

This application claims priority to and the benefit of Korean Patent Application Nos. 10-2016-0184066 and 10-2017-0157648, filed in the Korean Intellectual Property Office on Dec. 30, 2016 and Nov. 23, 2017, respectively, the entire contents of which are incorporated herein by reference.

BACKGROUND OF THE INVENTION

1. Field of the Invention

The present invention relates to a method and apparatus for transmitting downlink data and uplink data in a narrowband (NB)-Internet of Things (IoT) system.

2. Description of Related Art

Narrowband (NB)-Internet of Things (IoT) refers to an IoT system which is being standardized by $3^{rd}$ generation partnership project (3GPP), which is international standard organization. NB-IoT is based on an existing LTE (long term evolution) system.

NB-IoT may have two characteristics. One is that the number of terminals is vast, and the other is that the amount of data transmitted and received between each terminal and a network is small.

The existing LTE system requires a data transmission rate of several tens to 100 Mbps or more depending on the characteristics of a service, whereas the NB-IoT has characteristics that only a small amount of data is (non) periodically transmitted and received.

In order for the terminal to access the network and receive the service, numerous message procedures between a base station and the terminal, and numerous message procedures between a backbone network and the terminal are performed. An interface between the base station and the terminal is defined by a RRC (radio resource control) protocol and an interface between the network and the terminal is defined by a NAS (non-access stratum) protocol.

In order for the base station to exchange an NAS message with the network, the base station uses S1AP (S1 application protocol).

The NB-IoT system is trying to minimize a system load caused by such a control message procedure. However, since the NB-IoT system uses the procedure of the existing LTE system as it is, it still uses a complex message procedure.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for simplifying a control message procedure for a narrowband (NB)-Internet of Things (IoT) system.

An exemplary embodiment of the present invention provides a method for transmitting downlink data by a network node. The method for transmitting the downlink data includes creating downlink data for a terminal which is in a radio resource control (RRC) idle state; inserting the downlink data into a first paging message for transitioning the terminal to an RRC connected state, when a size of the downlink data is smaller than a reference value; and transmitting the first paging message to the terminal through a base station.

The creating of the downlink data may include creating the downlink data having a non-access stratum (NAS) protocol data unit (PDU) format.

The downlink data included in the first paging message may be inserted into an RRC paging message by the base station receiving the first paging message.

The inserting of the downlink data into the first paging message may include creating the first paging message for a narrowband (NB)-internet of things (IOT) system.

The creating of the downlink data may include applying integrity protection and encryption based on a NAS security key to the downlink data.

Another embodiment of the present invention provides a method for transmitting uplink data by a terminal which is in a radio resource control (RRC) idle state. The method for transmitting the uplink data includes creating uplink data; inserting the uplink data into an uplink common control channel (CCCH) message using the same resource as an RRC connection request message, when a size of the uplink data is smaller than a reference value; and transmitting the uplink CCCH message to a base station.

The inserting of the uplink data into the uplink CCCH message may include creating the uplink CCCH message; and inserting the uplink data having a non-access stratum (NAS) message format into the uplink CCCH message.

The inserting of the uplink data into the uplink CCCH message may include inserting identity of the terminal into the uplink CCCH message.

The uplink data included in the uplink CCCH message may be inserted into an S1 application protocol (S1AP) message to be transmitted to a network node, by the base station receiving the uplink CCCH message.

When validity of the uplink data included in the S1AP message is verified through the identity of the terminal by the network node receiving the S1AP message, the uplink data may be transferred to a destination of the uplink data by the network node.

The inserting of the uplink data into the uplink CCCH message may include creating the uplink CCCH message for a narrowband (NB)-internet of things (IOT) system.

Yet another embodiment of the present invention provides network node for a narrowband (NB)-internet of things (IOT) system. The network node includes a memory and a processor controlling the memory.

The processor may create downlink data for a terminal which is in a radio resource control (RRC) idle state in which an RRC connection with a base station is disconnected, insert the downlink data into an S1 application protocol (S1AP) paging message for transitioning the terminal to an RRC connected state, and transmit the S1AP paging message to the base station.

According to an exemplary embodiment of the present invention, the control message procedure for the NB-IoT system may be simplified.

Further, according to an exemplary embodiment of the present invention, the downlink data and the uplink data may be efficiently transmitted in the NB-IoT system.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the present specification, an overlapping description of the same component will be omitted.

In addition, in the present specification, it is to be understood that when any component is referred to as being connected to or coupled to another component, it may be connected directly to or coupled directly to another component or be connected to or coupled to another component with the other component intervening therebetween. On the other hand, in the present specification, it is to be understood that when any component is referred to as being connected directly to or coupled directly to another component, it may be connected to or coupled to another component without the other component intervening therebetween.

In addition, terms used in the present specification are merely used to describe a specific exemplary embodiment and are not intended to limit the present invention.

In addition, in the present specification, singular forms include plural forms unless interpreted otherwise in a context.

In addition, it is to be understood that the term "comprises" or "have" used in this specification, specifies the presence of features, numerals, steps, operations, components, parts, or a combination thereof described in the specification, but does not preclude the presence or addition of one or more other features, numerals, steps, operations, components, parts, or a combination thereof.

In addition, in the present specification, a term 'and/or' includes a combination of a plurality of described items or any one of the plurality of described items. In the present specification, term 'A or B' may include 'A', 'B', or 'both A and B'.

In addition, in the present specification, a terminal may also refer to a mobile terminal, a mobile station, an advanced mobile station, a high reliability mobile station, a subscriber station, a portable subscriber station, an access terminal, a user equipment (UE), a machine type communication device (MTC), or the like, and may also include all or some of the functions of the mobile terminal, the mobile station, the advanced mobile station, the high reliability mobile station, the subscriber station, the portable subscriber station, the access terminal, the user equipment, the MTC, or the like.

In addition, in the present specification, a base station (BS) may also refer to an advanced base station, a high reliability base station (HR-BS), a node B (NB), an evolved node B (eNB), a new radio (NR) node B (e.g., gBN), an access point, a radio access station, a base transceiver station, a mobile multi-hop relay (MMR)-BS, a relay station serving as the base station, a high reliability relay station serving as the base station, a repeater, a macro base station, a small base station, a femto base station, a home node B (HNB), a home eNB (HeNB), a pico base station, a micro base station, or the like, and may also include all or some of the functions of the advanced base station, the HR-BS, the node B, the eNB, the gNB, the access point, the radio access station, the base transceiver station, the MMR-BS, the relay station, the high reliability relay station, the repeater, the macro base station, the small base station, the femto base station, the HNB, the HeNB, the pico base station, the micro base station, or the like.

Hereinafter, a method for operating an NB-IoT control message will be described. A technology of controlling a radio resource control (RRC) message and an S1 application protocol (S1AP) message for the NB-IoT system will be described.

Figure 1A:
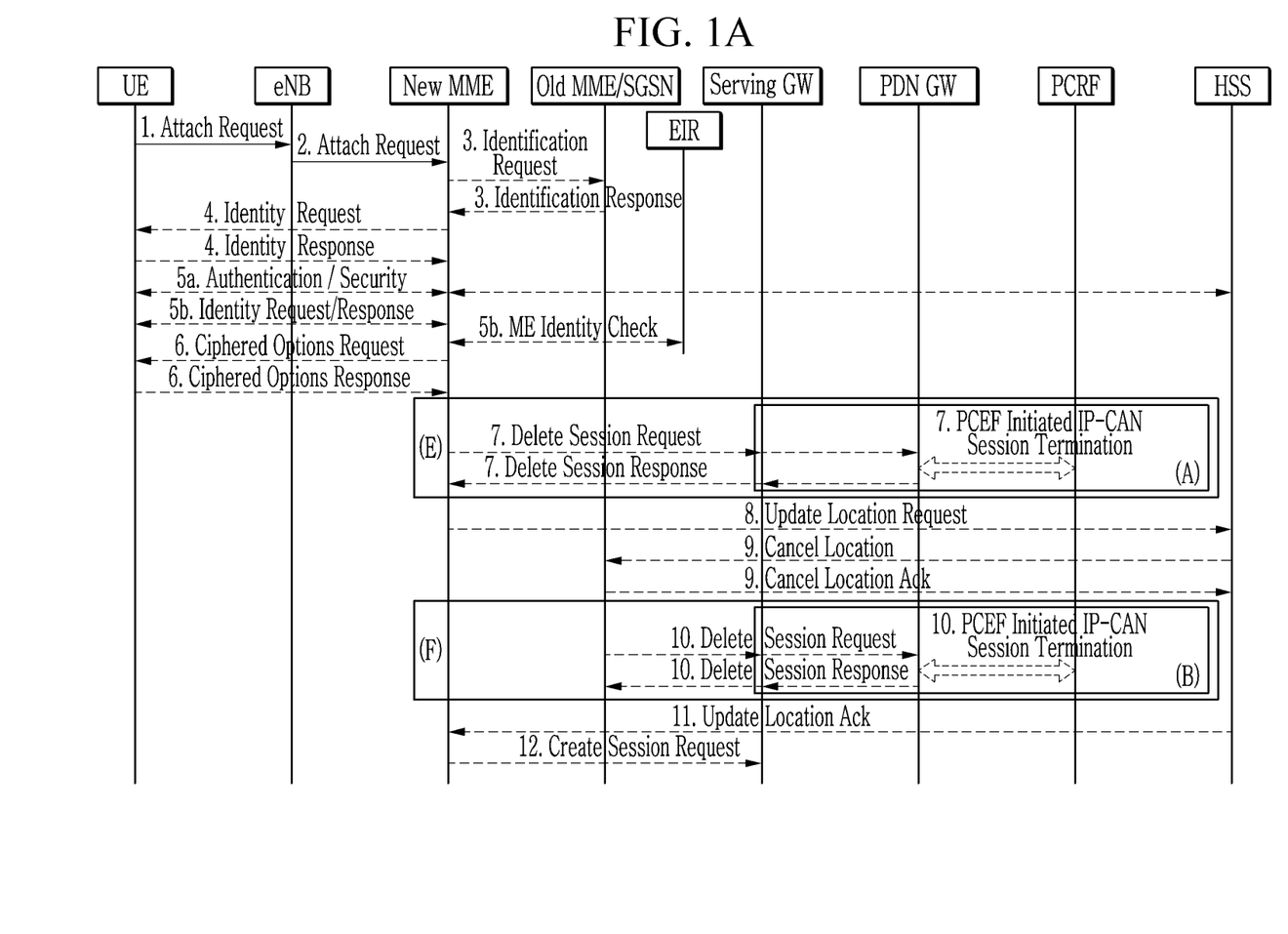
FIGS. 1A and 1B are diagrams illustrating an attach procedure.
Figure 1B:
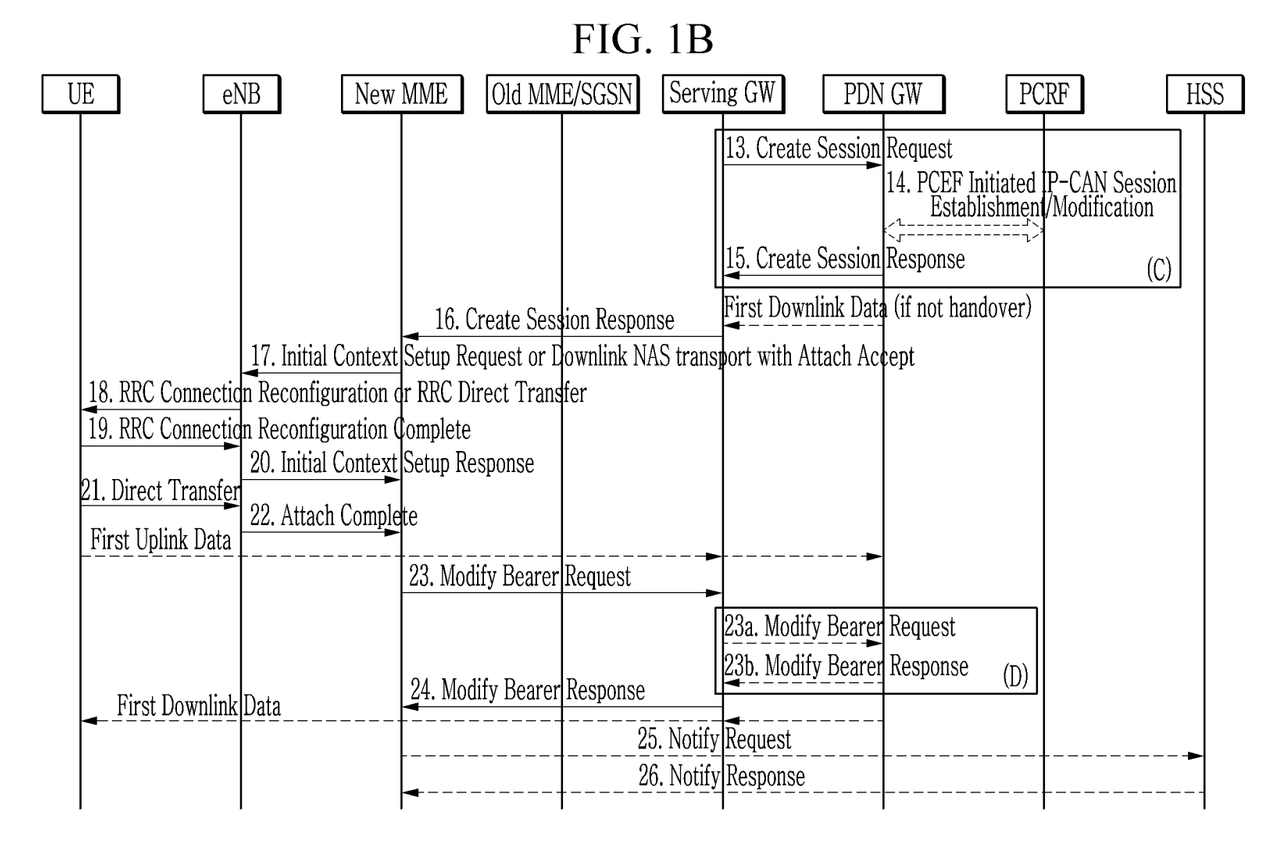
Figure 2:
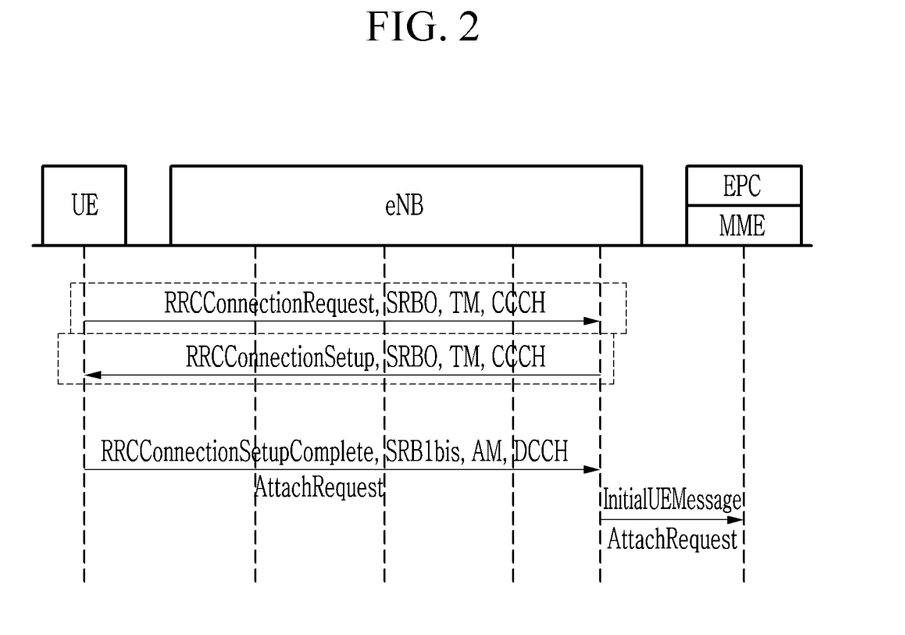
FIG. 2 is a diagram specifically illustrating an attach request procedure illustrated in FIG. 1A.

FIGS. 1A and 1B are diagrams illustrating an attach procedure. In addition, FIG. 2 is a diagram specifically illustrating an attach request procedure illustrated in FIG. 1A.

In order for a terminal to access a network and receive a service, the terminal needs to perform an attach procedure. The attach procedure is a procedure necessary for a specific terminal to access the network, and is a procedure for determining whether the corresponding terminal is a valid terminal based on identity of the terminal stored in the network and approving the access. The attach procedure includes a total of two steps, where one is that a wireless connection between the terminal and a base station is set, and the other is that a procedure such as authentication is performed through a context exchange between the terminal and the network. Specifically, the attach procedure is defined as in FIGS. 1A and 1B below.

FIGS. 1A and 1B illustrate attach procedures performed by network nodes (e.g., a terminal (UE), a base station (eNB), a new MME (mobility management entity), an old MME/SGSN (serving general packet radio service support node), an EIR (equipment identity register), a serving GW (gateway), a PDN (packet data network) GW, a PCRF (policy and charging rules function), a HSS (home subscriber server), and the like). Specifically, FIG. 1B illustrates procedures after the procedures illustrated in FIG. 1A.

In particular, a procedure '1. Attach Request' illustrated in FIG. 1A will be described in detail with reference to FIG. 2.

The terminal (UE) transmits an RRC connection request message (e.g., RRCConnectionRequest) to the base station (eNB) to request a wireless connection. Specifically, the terminal may transmit the RRCConnectionRequest message to the base station by using SRB (signaling radio bearer) 0, TM (transparent mode), and CCCH (common control channel).

In response to the RRC connection request message of the terminal, the base station allocates radio resources to the terminal through an RRC connection setup message (e.g., RRCConnectionSetup). Specifically, the base station may transmit the RRCConnectionSetup message to the terminal by using SRB0, TM and CCCH.

In a case in which the terminal normally receives the RRC connection setup message (e.g., RRCConnectionSetup), the terminal transmits an RRC connection setup complete message (e.g., RRCConnectionSetupComplete) to the base station in response to the RRC connection setup message. Specifically, the terminal may transmit the RRCConnectionSetupComplete message to the base station by using SRB1bis, AM (acknowledged mode) and DCCH (dedicated control channel). Here, the terminal includes an NAS message (e.g., AttachRequest) requesting a network access in the RRC connection setup complete message (e.g., RRCConnectionSetupComplete).

In a case in which the base station receives the RRC connection setup complete message (e.g., RRCConnectionSetupComplete), the base station includes the corresponding NAS message (e.g., AttachRequest) in an S1AP message (e.g., InitialUEMessage) and then transmits it to the network (e.g., EPC (evolved packet core), MME).

Meanwhile, a procedure '3. Identification Request' to a procedure '6. Ciphered Options Request' illustrated in FIG. 1A are procedures between the terminal and the network and are procedures checking whether or not the terminal is valid, or the like. In a case in which such a check is successful, resources for actually transmitting and receiving actual user data are allocated and the procedure is terminated, through a procedure '17. Initial Context Setup Request or Downlink NAS transport with Attach Accept' to a procedure '19. RRC connection Reconfiguration Complete' illustrated in FIG. 1B.

In a case in which the base station successfully receives the RRCConnectionSetupComplet message, the terminal is in an RRC connected state. This means that an RRC connection between the terminal and the base station is setup.

In a case in which the attached terminal no longer receives the service, since the terminal does not need to be connected to the base station, the RRC connection is disconnected. In this case, the terminal is in an RRC idle state.

Since the terminal in the RRC idle state is in a state in which the terminal is already checked by the network through the attach procedure, a procedure '3. Identification Request' to a procedure 6. Ciphered Options Request' among the procedures illustrated in FIGS. 1A and 1B will be omitted in a case in which the terminal in the RRC idle state again performs the connection.

Hereinafter, a procedure until the terminal in the RRC idle state receives the service (e.g., transmits and receives data) will be described.

For two reasons, the terminal in the RRC idle state transitions to the RRC connected state. One is a case in which data to be transmitted to the terminal by the network exists, and the other is a case in which the terminal itself determines that it needs to transmit the data to the network.

For example, in a case in which the terminal is an electric meter in a home, a former reason may correspond to a case in which a server collecting electric metering information requests a specific terminal to report a usage amount for a specific period, and the latter reason may correspond to a case in which the terminal determines that the data needs to be transmitted at a predefined reporting point (e.g., at the end of the month, etc.).

1. Case in which Data Occurs from Network

Figure 3:
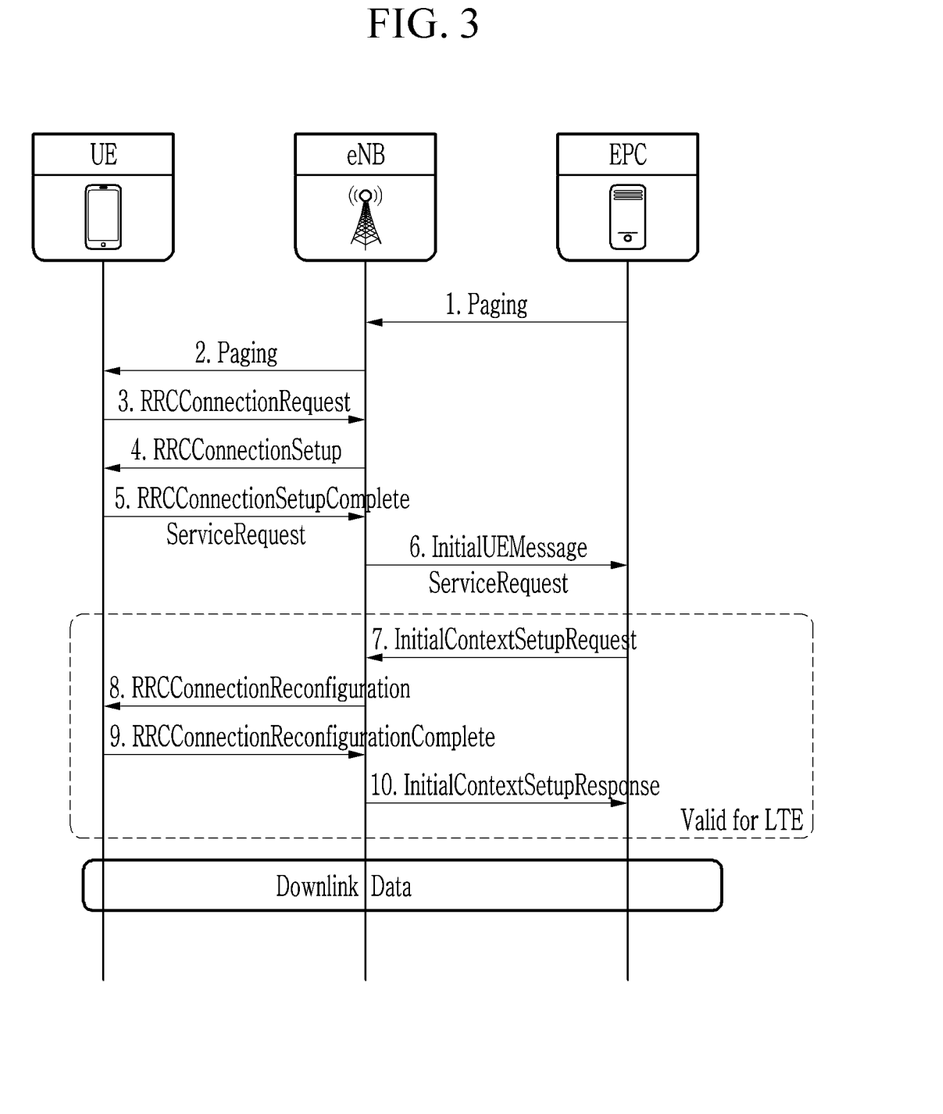
FIG. 3 is a diagram illustrating a control message flow of a case in which data to be transmitted to a terminal in an RRC idle state by a network occurs.

FIG. 3 is a diagram illustrating a control message flow of a case in which data to be transmitted to a terminal in an RRC idle state by a network occurs.

The network (e.g., EPC) transmits a paging message to the base station (e.g., eNB) to transition the terminal in the RRC idle state to the RRC connected state.

The base station transmits a RRC paging message to the terminal (e.g., UE) based on the paging message received from the network.

In the case in which the terminal receives the RRC paging message from the base station, the terminal recognizes that it needs to reconnect to the network. In addition, after a procedure 'RRCConnectionRequest' to a procedure '10. InitialcontextSetupResponse' illustrated in FIG. 3 are performed, the terminal receives downlink data from the network.

Meanwhile, a procedure '7. InitialContextSetupRequest' to a procedure '10. InitialContextSetupResponse' illustrated in FIG. 3 are valid for the LTE system. In the case of the NB-IoT system, the procedure '7. InitialContextSetupRequest' to the procedure '10. InitialContextSetupResponse' illustrated in FIG. 3 may be omitted.

Hereinafter, a method for simplifying the above-mentioned procedures for the NB-IoT system will be described.

Figure 4:
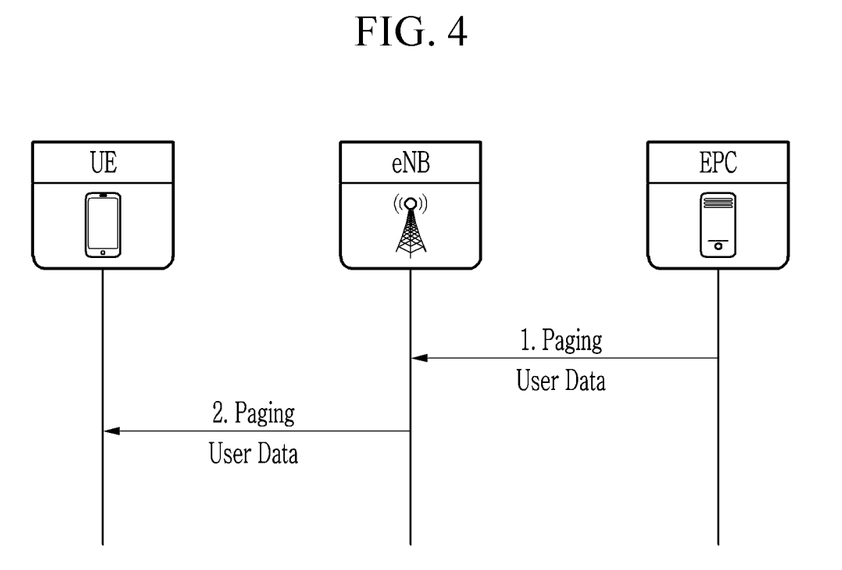
FIG. 4 is a diagram illustrating a method for transmitting downlink data according to an exemplary embodiment of the present invention.

FIG. 4 is a diagram illustrating a method for transmitting downlink data according to an exemplary embodiment of the present invention.

In a case in which the network (e.g., EPC) recognizes data (e.g., first user data) to be transmitted to the terminal and then transmits the paging message, the first user data may be included in the paging message.

In a case in which the base station (e.g., eNB) receives the paging message from the network, the base station may include the first user data included in the paging message in the RRC paging message.

The terminal (e.g., UE) receives the RRC paging message including the first user data from the base station. As a result, the terminal may receive the downlink data by using only the paging message.

Meanwhile, the user data included in the paging message may have the same format as NAS PDU (protocol data unit) defined in an existing technical specification. This means that the user data may be transmitted in any NAS message format.

The paging message is defined in 3GPP TS 36.331 (RRC) and 3GPP TS 36.413 (S1AP). A new paging message structure based on S1AP message/RRC paging message defined in V13.3.0 is as in Table 1 (S1AP paging) and Table 2 (RRC paging) below.

TABLE 1

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |

TABLE 1-continued

| IE/Group Name | Presence | Range | IE type and reference | Semantics description | Criticality | Assigned Criticality |
|---|---|---|---|---|---|---|
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1 ... <maxnoofTAIs> | | | EACH | ignore |
| >>TAI | M | | 9.2.3.16 | | — | |
| CSG Id List | | 0 ... 1 | | | GLOBAL | ignore |
| >CSG Id | | 1 ... <maxnoofCSGId> | 9.2.1.62 | | — | |
| Paging Priority | O | | 9.2.1.78 | | YES | ignore |
| UE Radio Capability for Paging | O | | 9.2.1.98 | | YES | ignore |
| Assistance Data for Paging | O | | 9.2.1.103 | | YES | ignore |
| Paging eDRX Information | O | | 9.2.1.111 | | YES | ignore |
| Extended UE Identity Index Value | O | | 9.2.3.46 | | YES | ignore |
| NB-IoT Paging eDRX Information | O | | 9.2.1.115 | | YES | ignore |
| NAS PDU | O | 1 ... (maxPDUSize) | | OCTET STRING | YES | ignore |

The S1AP paging message for the method for transmitting the downlink data illustrated in FIG. 4 may further include 'NAS PDU' illustrated in Table 1, as compared to an existing S1AP paging message.

TABLE 2

```
Paging-NB ::=                    SEQUENCE {
    pagingRecordList-r13            PagingRecordList-NB-r13    OPTIONAL, -- Need ON
    systemInfoModification-r13      ENUMERATED {true}          OPTIONAL, -- Need ON
    systemInfoModification-eDRX-r   ENUMERATED {true}          OPTIONAL, -- Need ON
    13                              SEQUENCE { }               OPTIONAL
    nonCriticalExtension
}
PagingRecordList-NB-r13 ::=      SEQUENCE (SIZE (1..maxPageRec)) OF PagingRecord-NB-r13
PagingRecord-NB-r13 ::=          SEQUENCE {
    ue-Identity-r13                  PagingUE-Identiry,
    dedicatedInfoNAS-r13                 DedicatedInfoNAS
}
DedicatedInfoNAS ::=   OCTET STRING
```

The RRC paging message for the method for transmitting the downlink data illustrated in FIG. 4 may further include "dedicatedInfoNAS-r13 DedicatedInfoNAS' illustrated in Table 2, as compared to an existing RRC paging message.

Specifically, the NAS PDU setup in the S1AP paging message is mapped to a dedicatedInfoNAS-r13 parameter in the RRC paging message.

Due to characteristics of the paging message, since terminals may receive the same paging message, the NAS PDU of the S1AP paging message may be a packet to which integrity protection and encryption of NAS level are applied.

A method for transmitting downlink data by a network node (e.g., EPC) is as follows.

The network node (e.g., EPC) may create the downlink data for the terminal in the RRC idle state. Specifically, the network node (e.g., EPC) may create the downlink data having a NAS PDU format. The network node (e.g., EPC) may apply integrity protection and encryption based on a NAS security key to the downlink data.

The network node (e.g., EPC) may insert the downlink data into the paging message for transitioning the terminal to the RRC connected state. Specifically, in a case in which a size of the downlink data (e.g., a small amount of data) is smaller than a reference value, the network node (e.g., EPC) may insert the downlink data into the paging message (e.g., the S1AP paging message). Specifically, the network node (e.g., EPC) may create the paging message for the NB-IoT system. Meanwhile, in a case in which the size of the downlink data is greater than the reference value, the network node (e.g., EPC) may also perform the procedures illustrated in FIG. 3.

The network node (e.g., EPC) may transmit the paging message to the terminal through the base station. Specifically, the downlink data included in the paging message of the network node (e.g., EPC) may be inserted into the RRC paging message by the base station receiving the paging message of the network node (e.g., EPC).

2. Case in which Data Occurs from Terminal

Figure 5:
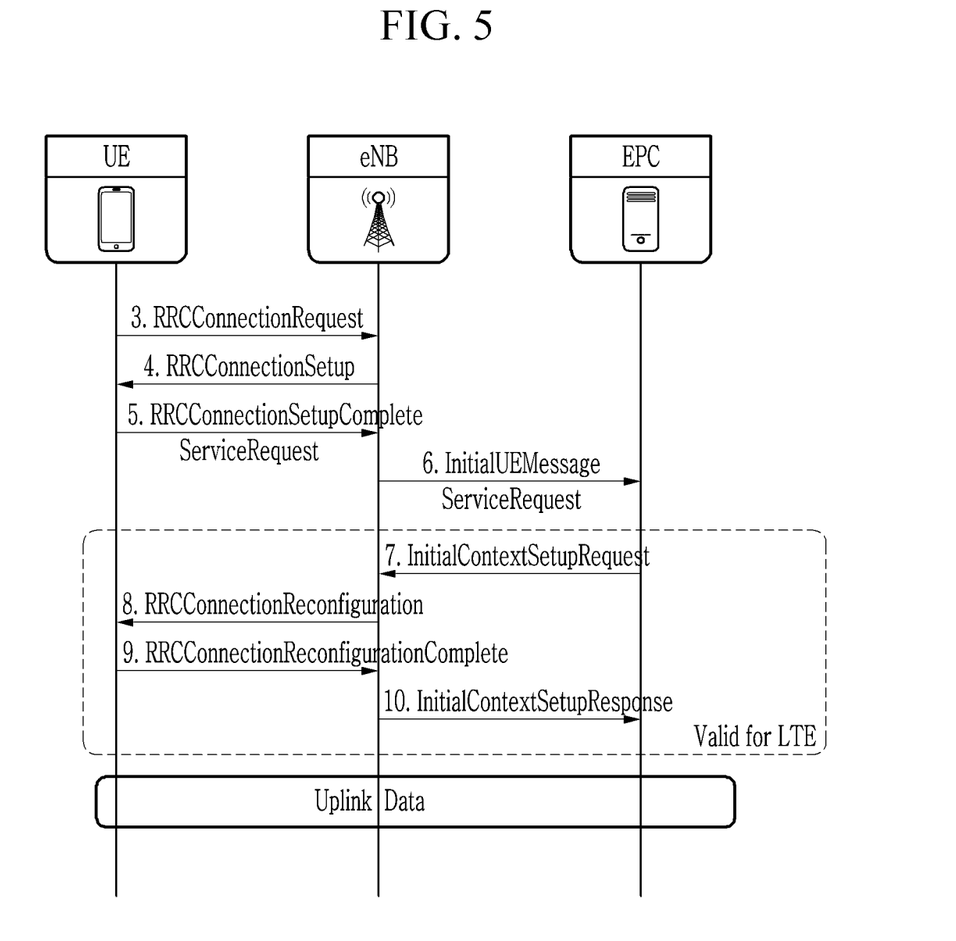
FIG. 5 is a diagram illustrating a procedure for a case in which data to be transmitted to the network by the terminal occurs.

FIG. 5 is a diagram illustrating a procedure for a case in which data to be transmitted to the network by the terminal occurs.

The procedure (e.g., the procedure illustrated in FIG. 5) for a case in which the terminal in the RRC idle state transitions to the RRC connected state by a request of the terminal and the procedure (e.g., the procedure illustrated in FIG. 3) for a case in which the terminal in the RRC idle state transitions to the RRC connected state by a request of the network are substantially similar to each other, but are differ in the paging message procedures (e.g., the procedure '1. paging' and the procedure '2. paging' illustrated in FIG. 3).

Hereinafter, a method for transmitting uplink data directly using only the RRC message by the terminal while omitting the RRC connection setup procedures (e.g., the procedure '3. RRCConnectionRequest' to the procedure '5. RRCConnectionSetupComplete') illustrated in FIG. 5 will be described.

However, a size limitation of an uplink CCCH message among the RRC message is not considered.

In order for the terminal in the RRC idle state to be transitioned to the RRC connected state, a first message transmitted to the base station by the terminal in the RRC idle state is a RRC connection request message (e.g., RRCConnectionRequest), and the RRC connection request message (e.g., RRCConnectionRequest) belongs to an uplink CCCH classification according to the RRC standard.

The RRC connection request message (e.g., RRCConnectionRequest) is a message used to setup a radio connection between the terminal and the base station, and includes contents such as identity (e.g., ID) of the terminal or a reason why the terminal request the connection.

Figure 6:
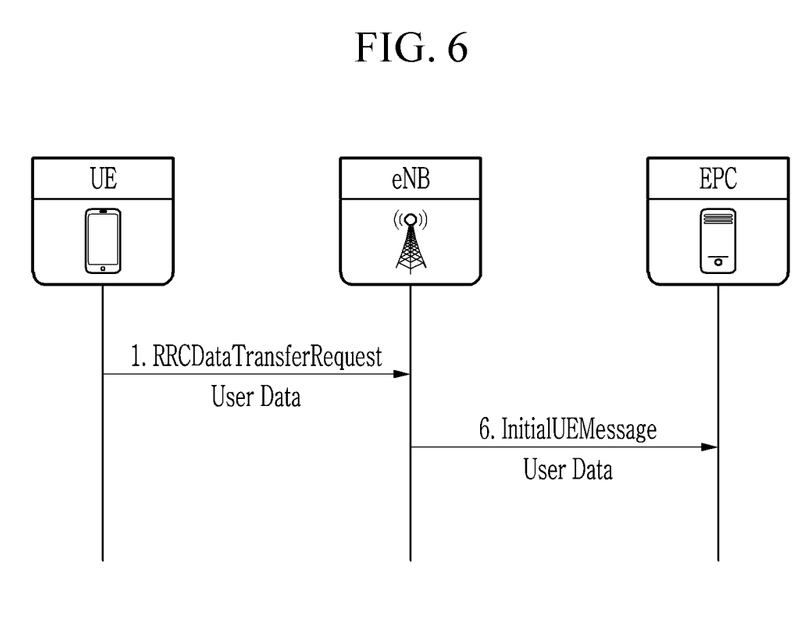
FIG. 6 is a diagram illustrating a method for transmitting uplink data according to an exemplary embodiment of the present invention.

FIG. 6 is a diagram illustrating a method for transmitting uplink data according to an exemplary embodiment of the present invention.

As illustrated in FIG. 6, a RRC data transfer request message (e.g., RRCDataTransferRequest) according to an exemplary embodiment of the present invention may be used instead of the RRC connection request message (e.g., RRCConnectionRequest). The RRC data transfer request message (e.g., RRCDataTransferRequest) corresponds to a new uplink CCCH message. A structure of the RRC data transfer request message (e.g., RRCDataTransferRequest) is as in Table 3 below.

TABLE 3

| RRCDataTransferRequest ::= | SEQUENCE { |
| dedicatedInfoNAS-r13 | DedicatedInfoNAS |
| } | |

Specifically, the terminal (e.g., UE) transmits the RRC data transfer request message (e.g., RRCDataTransferRequest) including the uplink data to the base station (e.g., eNB). For example, the terminal may transmit the uplink data having a NAS message format based on a dedicatedInfoNAS-r13 parameter to the base station. The NAS message based on the dedicatedInfoNAS-r13 parameter may include terminal identity (e.g., IMSI (international mobile subscriber identity), IMEI (international mobile station equipment identity), and the like) so that the terminal may be identified by the network.

In a case in which the base station receives the RRC data transfer request message (e.g., RRCDataTransferRequest) from the terminal, the base station includes information included in the RRC data transfer request message (e.g., RRCDataTransferRequest) in the S1AP message (e.g., UplinkNASTransport) and then transmits it to the network (e.g., EPC). Here, the UplinkNASTransport message may correspond to the InitialUEMessage message.

The network verifies validity of data included in the NAS message (or the S1AP message) using identity of the terminal included in the NAS message (or the S1AP message) (e.g., UplinkNASTransport, InitialUEMessage) received from the base station, and transfers the data included in the NAS message (or the S1AP message) to a final destination.

A method for transmitting the uplink data by the terminal in the RRC idle state will be described as follows.

The terminal may create the uplink data.

In the case in which the size of the uplink data (e.g., a small amount of data) is smaller than the reference value, the terminal may insert the uplink data into the uplink CCCH message (e.g., RRCDataTransferRequest) using the same resource as the RRC connection request message. Specifically, the terminal may create the uplink CCCH message for the NB-IoT system, and may insert the uplink data having the NAS (non-access stratum) message format into the uplink CCCH message. The terminal may insert the terminal's own identity into the uplink CCCH message. Meanwhile, in a case in which the size of the uplink data is greater than the reference value, the terminal may also perform the procedures illustrated in FIG. 5.

The terminal may transmit the uplink CCCH message to the base station. The information (e.g., uplink data, terminal identity, and the like) included in the uplink CCCH message may be inserted into the S1AP message to be transmitted to the network node (e.g., EPC), by the base station receiving the uplink CCCH message. In a case in which the validity of the uplink data included in the S1AP message is verified through the terminal identity by the network node (e.g., EPC) receiving the S1AP message, the uplink data may be transferred to the destination of the uplink data by the network node (e.g., EPC).

Figure 7:
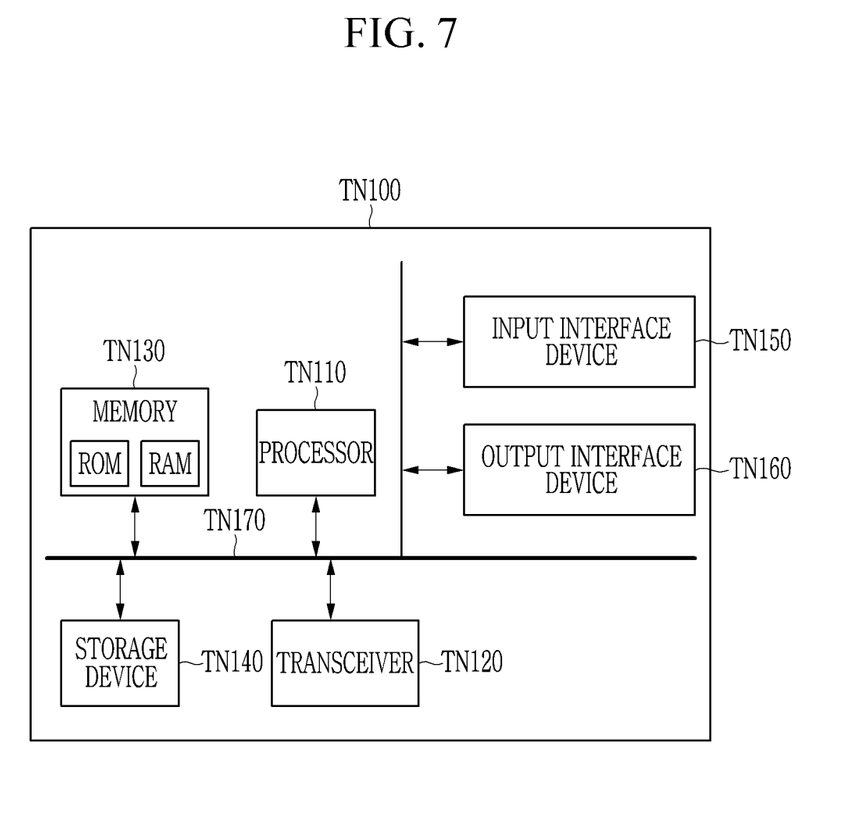
FIG. 7 is a diagram illustrating a computing device according to an exemplary embodiment of the present invention.

FIG. 7 is a diagram illustrating a computing device according to an exemplary embodiment of the present invention. A computing device TN100 of FIG. 7 may be the base station, the terminal, or the EPC described in the present specification. Alternatively, the computing device TN100 of FIG. 7 may be a wireless device, a network node, a transmitter, or a receiver.

In an exemplary embodiment of FIG. 7, the computing device TN100 may include at least one processor TN110, a transceiver TN120 connected to a network to perform communication, and a memory TN130. In addition, the computing device TN100 may further include a storage device TN140, an input interface device TN150, an output interface device TN160, and the like. The components included in the computing device TN100 may be connected to each other through a bus TN170 to perform the communication with each other.

The processor TN110 may execute a program command stored in at least one of the memory TN130 and the storage device TN140. The processor TN110 may refer to a central processing unit (CPU), a graphics processing unit (GPU), or a dedicated processor in which the methods according to the exemplary embodiments of the present invention are performed. The processor TN110 may be configured to implement the procedures, the functions, and the methods described in relation to the exemplary embodiments of the present invention. The processor TN110 may control the respective components of the computing device TN100.

Each of the memory TN130 and the storage device TN140 may store various information related to an operation of the processor TN110. Each of the memory TN130 and the storage device TN140 may include at least one of a volatile storage medium and a non-volatile storage medium. For example, the memory TN130 may include at least one of a read only memory (ROM) and a random access memory (RAM).

The transceiver TN120 may transmit or receive a wired signal or a wireless signal. In addition, the computing device TN100 may have a single antenna or multiple antennas.

The above-mentioned exemplary embodiments of the present invention are not embodied only by an apparatus and method. Alternatively, the above-mentioned exemplary embodiments may be embodied by a program performing functions, which correspond to the configuration of the exemplary embodiments of the present invention, or a recording medium on which the program is recorded. These implementations can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting uplink user data by a user terminal, the method comprising:

determining whether a size of the uplink user data is smaller than a reference value when the uplink user data to be transferred to a core network via a base station is generated by the user terminal which is in a radio resource control (RRC) idle state;

inserting the uplink user data to have a non-access stratum (NAS) message format into an uplink common control channel (CCCH) message which is used to establish the RRC connection between the user terminal and the base station when the size of the uplink user data is smaller than the reference value, where in the CCCH message is different from the RRC connection request message;

inserting, into the CCCH message, a terminal identity which allows the core network to identify the user terminal; and sending the uplink user data to the base station by transmitting the uplink CCCH message when the user terminal is in the RRC idle state, wherein the uplink user data sent to the base station through the uplink CCCH message is mapped to a parameter in the uplink CCCH message and is sent to the base station without the RRC connection.

2. The method of claim 1, wherein the terminal identity includes an international mobile subscriber identity (IMSI) or an international mobile station equipment identity (IMSI).

3. The method of claim 1, wherein the uplink CCCH message is an uplink CCCH message for a narrowband (NB)-internet of things (TOT) system.

\* \* \* \* \*